(12) United States Patent
Wang et al.

(10) Patent No.: US 12,490,317 B2
(45) Date of Patent: Dec. 2, 2025

(54) INDICATIONS ASSOCIATING LAYER 2 IDENTIFIERS WITH A USER EQUIPMENT FOR SIDELINK

(71) Applicant: QUALCOMM Incorporated, San Diego, CA (US)

(72) Inventors: Hua Wang, Basking Ridge, NJ (US); Sony Akkarakaran, Poway, CA (US); Jelena Damnjanovic, Del Mar, CA (US); Qing Li, Princeton Junction, NJ (US); Hong Cheng, Basking Ridge, NJ (US); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 704 days.

(21) Appl. No.: 17/810,670

(22) Filed: Jul. 5, 2022

(65) Prior Publication Data
US 2024/0015813 A1    Jan. 11, 2024

(51) Int. Cl.
*H04W 76/15* (2018.01)
*H04W 76/11* (2018.01)
*H04W 76/14* (2018.01)

(52) U.S. Cl.
CPC ............ *H04W 76/11* (2018.02); *H04W 76/14* (2018.02)

(58) Field of Classification Search
CPC ............ H04B 7/18528; H04B 7/18571; H04B 7/18576; H04W 28/0875; H04W 72/02; H04W 72/04; H04W 72/12; H04W 72/20; H04W 72/23; H04W 72/25; H04W 72/40; H04W 76/11; H04W 76/14; H04W 76/23; H04W 84/06
See application file for complete search history.

(56) References Cited

U.S. PATENT DOCUMENTS

| | | | |
|---|---|---|---|
| 10,873,989 B1 * | 12/2020 | Pan | H04W 76/14 |
| 11,019,670 B1 * | 5/2021 | Pan | H04W 76/14 |
| 11,057,950 B1 * | 7/2021 | Pan | H04W 76/11 |
| 11,259,350 B1 * | 2/2022 | Pan | H04W 88/04 |
| 11,432,354 B2 * | 8/2022 | Pan | H04W 88/04 |
| 12,133,286 B2 * | 10/2024 | Li | H04W 76/14 |
| 2020/0205209 A1 * | 6/2020 | Pan | H04W 4/40 |
| 2021/0144727 A1 * | 5/2021 | Pan | H04W 4/40 |
| 2021/0400745 A1 * | 12/2021 | Kuo | H04W 80/02 |
| 2021/0400746 A1 * | 12/2021 | Kuo | H04W 80/02 |
| 2022/0286892 A1 * | 9/2022 | Zhang | H04W 28/021 |
| 2024/0357467 A1 * | 10/2024 | Perras | H04W 12/03 |

\* cited by examiner

*Primary Examiner* — Frank Duong
(74) *Attorney, Agent, or Firm* — Harrity & Harrity, LLP

(57) ABSTRACT

Various aspects of the present disclosure generally relate to wireless communication. In some aspects, a first user equipment (UE) may establish, with a second UE, a first sidelink associated with a first layer 2 (L2) identifier of the second UE and a second sidelink associated with a second L2 identifier of the second UE, wherein the first L2 identifier is different than the second L2 identifier. The first UE may receive an indication associating the second UE with the first L2 identifier and the second L2 identifier. Numerous other aspects are described.

30 Claims, 11 Drawing Sheets

INDICATIONS ASSOCIATING LAYER 2 IDENTIFIERS WITH A USER EQUIPMENT FOR SIDELINK

FIELD OF THE DISCLOSURE

Aspects of the present disclosure generally relate to wireless communication and to techniques and apparatuses for indications associating layer 2 identifiers with a user equipment for sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include establishing, with a second UE, a first sidelink associated with a first layer 2 (L2) identifier of the second UE and a second sidelink associated with a second L2 identifier of the second UE, wherein the first L2 identifier is different than the second L2 identifier. The method may include receiving an indication associating the second UE with the first L2 identifier and the second L2 identifier.

Some aspects described herein relate to a method of wireless communication performed by a network entity. The method may include receiving, from a first UE, a communication indicating a first L2 identifier associated with a first sidelink between the first UE and a second UE, and a second L2 identifier associated with a second sidelink between the first UE and the second UE. The method may include transmitting, to the first UE, an indication associating the second UE with the first L2 identifier and the second L2 identifier.

Some aspects described herein relate to an apparatus for wireless communication at a first UE. The apparatus may include a memory and one or more processors coupled to the memory. The memory may comprise instructions executable by the one or more processors to cause the apparatus to establish, with a second UE, a first sidelink associated with a first L2 identifier of the second UE and a second sidelink associated with a second L2 identifier of the second UE, wherein the first L2 identifier is different than the second L2 identifier. The one or more processors may be configured to receive an indication associating the second UE with the first L2 identifier and the second L2 identifier.

Some aspects described herein relate to an apparatus for wireless communication at a network entity. The apparatus may include a memory and one or more processors coupled to the memory. The memory may comprise instructions executable by the one or more processors to cause the apparatus to receive, from a first UE, a communication indicating a first L2 identifier associated with a first sidelink between the first UE and a second UE, and a second L2 identifier associated with a second sidelink between the first UE and the second UE. The one or more processors may be configured to transmit, to the first UE, an indication associating the second UE with the first L2 identifier and the second L2 identifier.

Some aspects described herein relate to a non-transitory computer-readable medium that stores a set of instructions for wireless communication by a first UE. The set of instructions, when executed by one or more processors of the first UE, may cause the first UE to establish, with a second UE, a first sidelink associated with a first L2 identifier of the second UE and a second sidelink associated with a second L2 identifier of the second UE, wherein the first L2 identifier is different than the second L2 identifier. The set of instructions, when executed by one or more processors of the first UE, may cause the first UE to receive an indication associating the second UE with the first L2 identifier and the second L2 identifier.

Some aspects described herein relate to a non-transitory computer-readable medium that stores a set of instructions for wireless communication by a network entity. The set of instructions, when executed by one or more processors of the network entity, may cause the network entity to receive, from a first UE, a communication indicating a first L2 identifier associated with a first sidelink between the first UE and a second UE, and a second L2 identifier associated with a second sidelink between the first UE and the second UE. The set of instructions, when executed by one or more processors of the network entity, may cause the network entity to transmit, to the first UE, an indication associating the second UE with the first L2 identifier and the second L2 identifier.

Some aspects described herein relate to an apparatus for wireless communication. The apparatus may include means for establishing, with a UE, a first sidelink associated with a first L2 identifier of the UE and a second sidelink associated with a second L2 identifier of the UE, wherein the first L2 identifier is different than the second L2 identifier. The apparatus may include means for receiving an indication associating the UE with the first L2 identifier and the second L2 identifier.

Some aspects described herein relate to an apparatus for wireless communication. The apparatus may include means for receiving, from a first UE, a communication indicating a first L2 identifier associated with a first sidelink between the first UE and a second UE, and a second L2 identifier associated with a second sidelink between the first UE and the second UE. The apparatus may include means for transmitting, to the first UE, an indication associating the second UE with the first L2 identifier and the second L2 identifier.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
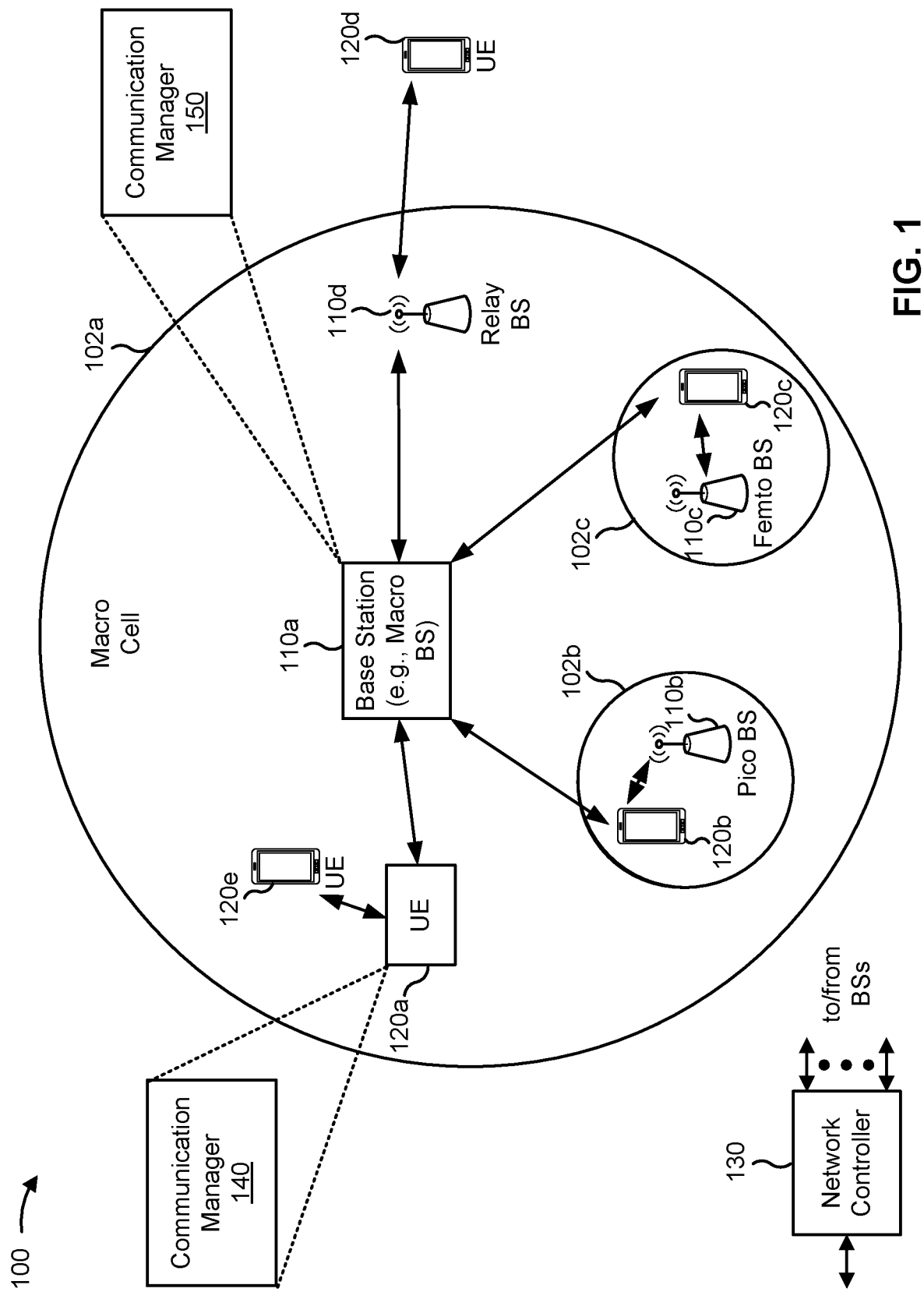
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is shown as an integral unit in FIG. 1, aspects of the disclosure are not so limited. In some other aspects, the functionality of the base station may be disaggregated according to an open radio access network (O-RAN) architecture or the like, which is described below in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may establish, with another UE, a first sidelink associated with a first layer 2 (L2) identifier of the other UE and a second sidelink associated with a second L2 identifier of the other UE, wherein the first L2 identifier is different than the second L2 identifier; and receive an indication associating the other UE with the first L2 identifier and the second L2 identifier. Additionally, or alternatively, the communication manager 140 may perform one or more other operations described herein.

In some aspects, the network entity described elsewhere herein may correspond to the base station 110. In such aspects, the network entity may include a communication manager 150. As described in more detail elsewhere herein, the communication manager 150 may receive, from a UE, a communication indicating a first L2 identifier associated with a first sidelink between the UE and another UE, and a second L2 identifier associated with a second sidelink between the UE and the other UE; and transmit, to the UE, an indication associating the other UE with the first L2 identifier and the second L2 identifier. Additionally, or alternatively, the communication manager 150 may perform one or more other operations described herein.

As indicated above, FIG. 1 is provided as an example. Other examples may differ from what is described with regard to FIG. 1.

Figure 2:
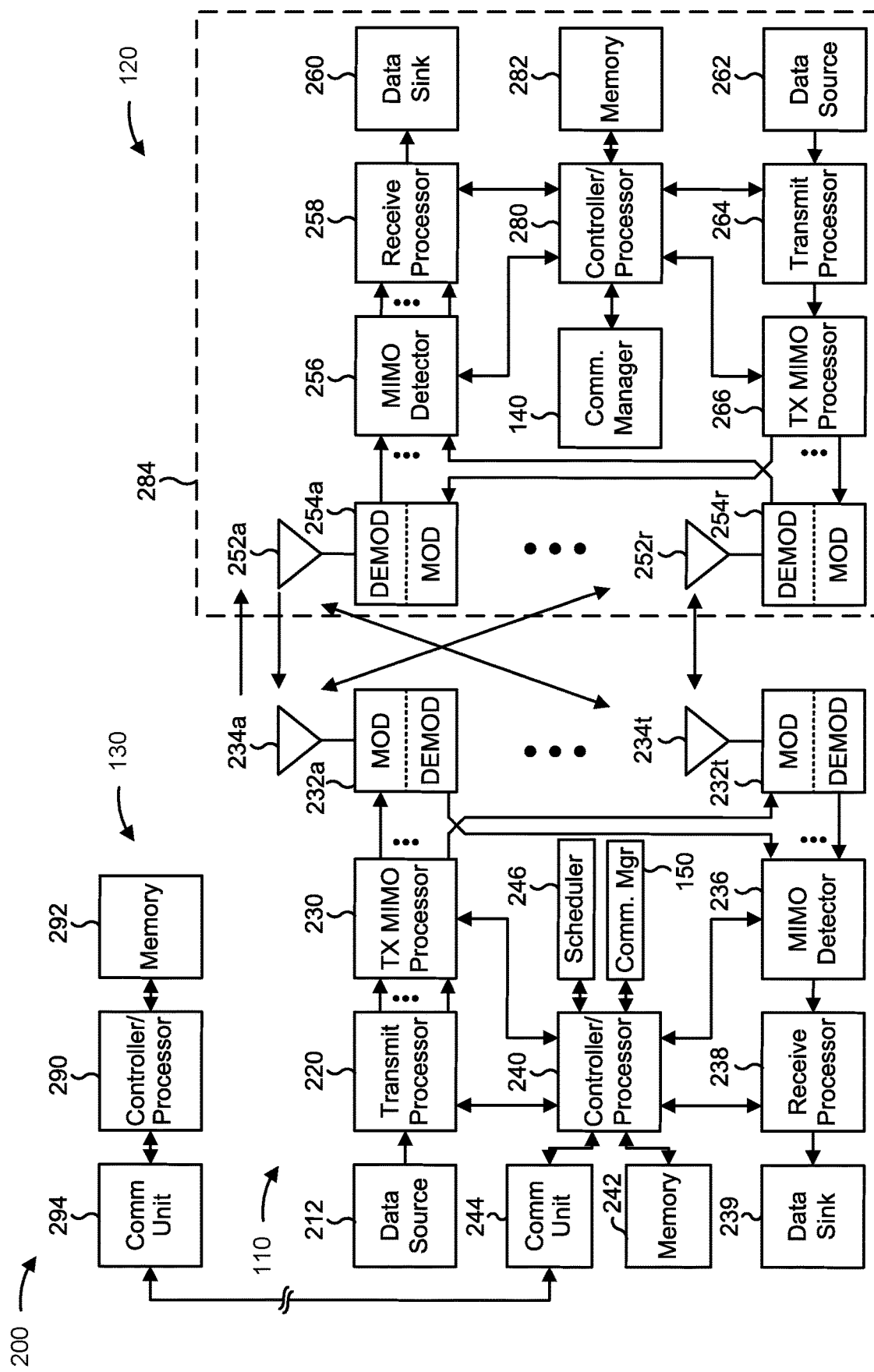
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the base station 110, the controller/processor 280 of the UE 120, and/or any other component(s) of FIG. 2 may perform one or more techniques associated with indications associating L2 identifiers with a UE for sidelink, as described in more detail elsewhere herein. In some aspects, the network entity described herein is the base station 110, is included in the base station 110, or includes one or more components of the base station 110 shown in FIG. 2. Moreover, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for establishing, with another UE, a first sidelink associated with a first L2 identifier of the other UE and a second sidelink associated with a second L2 identifier of the other UE, wherein the first L2 identifier is different than the second L2 identifier; and/or means for receiving an indication associating the other UE with the first L2 identifier and the second L2 identifier. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the base station 110) may include means for receiving, from a UE, a communication indicating a first L2 identifier associated with a first sidelink between the UE and another UE, and a second L2 identifier associated with a second sidelink between the UE and the other UE; and/or means for transmitting, to the UE, an indication associating the other UE with the first L2 identifier and the second L2 identifier. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
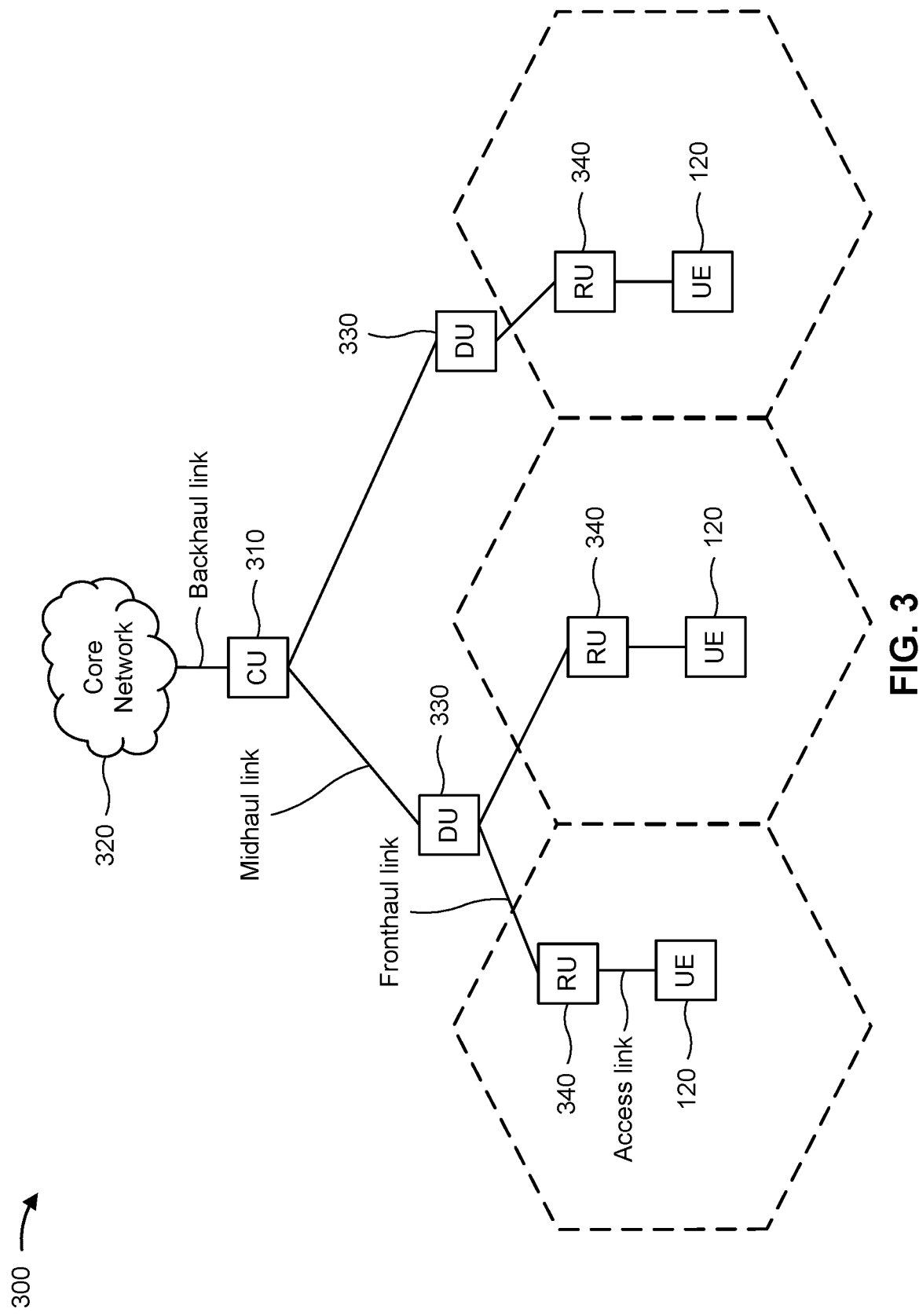
FIG. 3 is a diagram illustrating an example of an open radio access network architecture, in accordance with the present disclosure.

FIG. 3 is a diagram illustrating an example 300 of an O-RAN architecture, in accordance with the present disclosure. As shown in FIG. 3, the O-RAN architecture may include a centralized unit (CU) 310 that communicates with a core network 320 via a backhaul link. Furthermore, the CU 310 may communicate with one or more distributed units (DUs) 330 via respective midhaul links. The DUs 330 may each communicate with one or more radio units (RUs) 340 via respective fronthaul links, and the RUs 340 may each communicate with respective UEs 120 via radio frequency (RF) access links. The DUs 330 and the RUs 340 may also be referred to as O-RAN DUs (O-DUs) 330 and O-RAN RUs (O-RUs) 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based radio access network architecture.

As indicated above, FIG. 3 is provided as an example. Other examples may differ from what is described with regard to FIG. 3.

Figure 4:
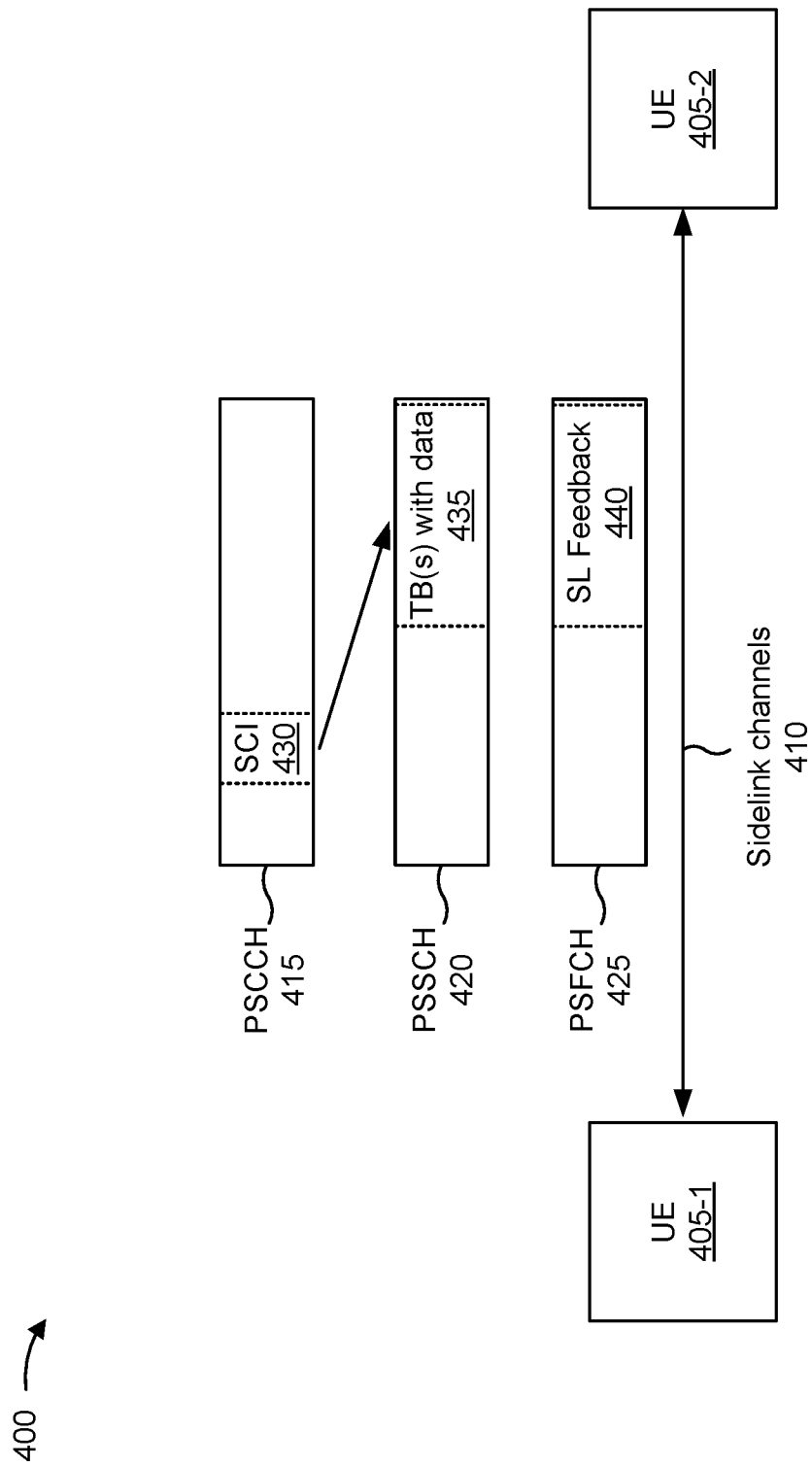
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARD) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
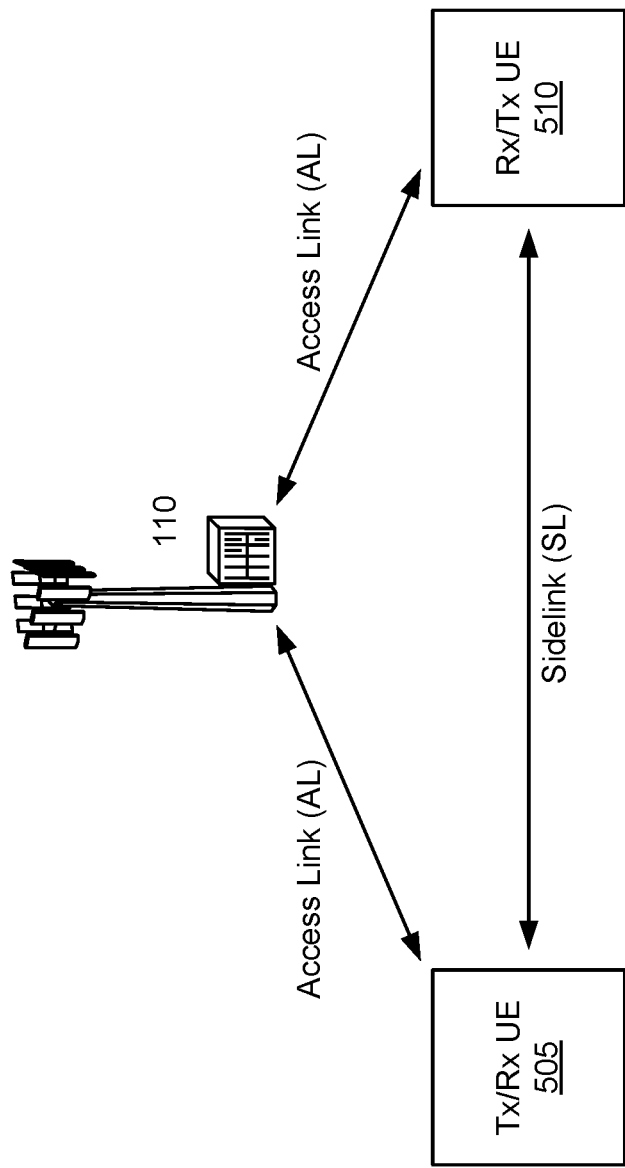
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some aspects, the Tx/Rx UE 505 and the Rx/Tx UE 510 may establish multiple sidelinks. For example, the pair of UEs 505, 510 may establish a first sidelink corresponding to a first service and/or application type, and may establish a second sidelink corresponding to a second service and/or application type. Aspects of multiple sidelinks established between a pair of UEs are described in more detail in connection with FIG. 6.

As indicated above, FIG. 5 is provided as an example. Other examples may differ from what is described with respect to FIG. 5.

Figure 6:
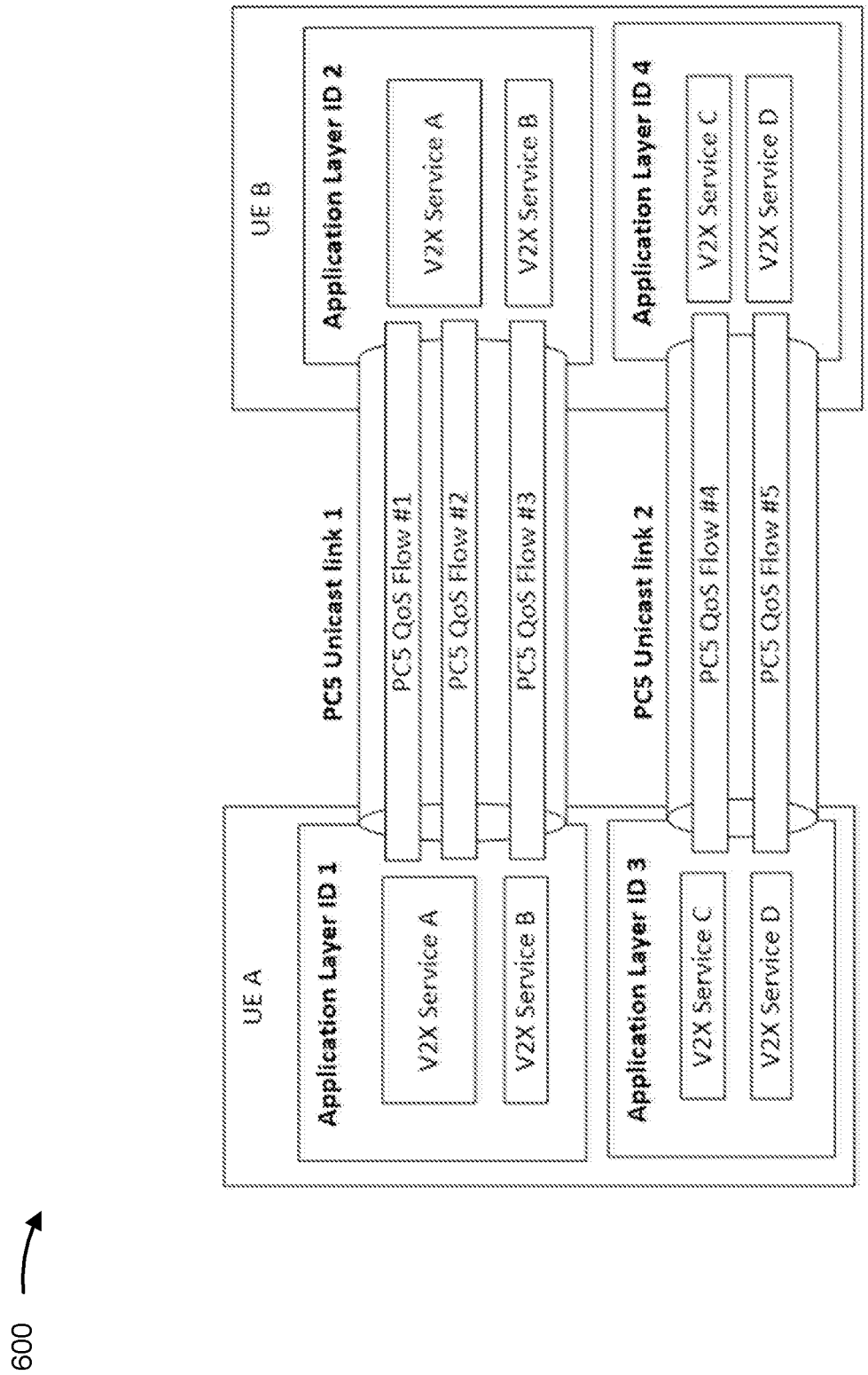
FIG. 6 is a diagram illustrating an example of unicast links between sidelink UEs, in accordance with the present disclosure.

FIG. 6 is a diagram illustrating an example 600 of unicast links between sidelink UEs, in accordance with the present disclosure.

Example 600 shows Figure 5.2.1.4-1 of 3GPP Technical Specification (TS) 23.287, where there are multiple sidelink (PC5) unicast links for V2X communications between peer V2X services, such as V2X service A used by UE A and UE B. Each unicast link may carry a PC5 QoS flow that is associated with a V2X service at the application layer. V2X services in a UE that use the same PC5 unicast link may use the same application layer ID (sometimes referred to as a layer 2 (L2) identifier). For example, as shown in example 600, unicast link 1 includes QoS flow #1 and QoS flow #2 between application layer ID 1 and application layer ID 2. A source UE may not be required to know whether different target application layer IDs over different unicast links belong to the same target UE. In some aspects, each UE (e.g., UE A and UE B) may maintain a mapping between application layer IDs and a source L2 identifier used for the PC5 unicast links (e.g., PC5 unicast link 1 and PC5 unicast link 2).

In some aspects, a pair of UEs communicating via a sidelink may exchange respective L2 identifiers during a PC5 unicast link establishment procedure. For example, each UE may determine a respective destination L2 identifier for signal reception for the corresponding PC5 unicast link. One of the UEs, sometimes referred to as an initiating UE, may initiate the PC5 unicast link establishment procedure by transmitting a direct communication request message to the other UE, sometimes referred to as a target UE. Because, prior to link establishment, the initiating UE may not know the destination L2 identifier associated with the target UE, the initiating UE may use a default destination L2 identifier associated with a service type (e.g., V2X service A, V2X service B, V2X service C, or V2X service D shown in FIG. 4), configured for unicast link establishment. In response, the target UE may transmit a direct communication accept message to the initiating UE, thus establishing the PC5 unicast link. During this procedure, respective L2 identifiers for the initiating UE and the target UE may be exchanged, and the L2 identifiers may thereafter be used for future communications between the pair of UEs. Aspects for providing the destination L2 identifier information to the access stratum (AS) layer may differ according to specific UE implementation. The PC5 unicast link establishment procedure described above is repeated for each unicast link to be established (e.g., for the example depicted in FIG. 6, PC5 unicast link 1 and PC5 unicast link 2), with each link associated with different L2 identifiers.

Because the destination L2 identifiers differ for each established sidelink, a pair of UEs may not be aware that two or more unicast links are associated with the same target UE. For example, UE A may associate the PC5 unicast link 1 with one destination L2 identifier (e.g., application layer ID 2) and may associate the PC5 unicast link 2 with another destination L2 identifier (e.g., application layer ID 4), but may not know that the L2 identifiers are associated with the same UE (e.g., UE B). Similarly, UE B may associate the PC5 unicast link 1 with one destination L2 identifier (e.g., application layer ID 1) and may associate the PC5 unicast link 2 with another destination L2 identifier (e.g., application layer ID 3), but may not know that the L2 identifiers are associated with the same UE (e.g., UE A).

However, in some aspects, it may be beneficial to identify that multiple L2 identifiers are associated with the same target UE in order to reduce signaling overhead and/or redundant communications between the pair of UEs. For example, if UE A is aware that the application layer ID 2 and the application layer ID 3 are both associated with UE B, then UE A may transmit certain communications over only one of the unicast links rather than over both of the unicast links to reduce signaling overhead or the like. For example, UE A may send communications relating to PC5 RRC signaling and UE context storage, sidelink beam management, sidelink channel measurement and reporting, sidelink link adaptation and power control, or similar communications using only one of the PC5 unicast link 1 or the PC5 unicast link 2.

Thus, in some aspects, a UE may signal to another UE that multiple L2 identifiers are associated with the same UE using an AS-level identifier. More particularly, during the PC5 unicast link establishment procedure described above, the pair of UEs may exchange AS-level identifiers, such as by including the corresponding AS-level identifier in one of the direct communication request message or the direct communication accept message. In such aspects, the initiating UE will thus transmit its L2 identifier and its AS-level identifier using the default destination L2 identifier associated with the service type, because the destination L2 identifier associated with the target UE is not yet known. Accordingly, every UE with the same service type (and thus the same default destination L2 identifier) may listen to the direct communication request and thus determine the initiating UE's AS-level identifier, which creates a security issue. Thus, UEs establishing one or more PC5 unicast links may either forgo AS-level identifier sharing for security reasons, thus resulting in increased signaling overhead and channel congestion, or else may share AS-level identifiers in an effort to reduce signaling overhead, resulting in non-secure communications.

Some techniques and apparatuses described herein enable associating multiple L2 identifiers with a source UE in a secure manner, resulting in reduced signaling overhead or the like while avoiding security concerns associated with the AS-level identifier sharing techniques described above. More particularly, in some aspects, a first UE (e.g., one of UE A or UE B) may establish, with another UE (e.g., the other one of UE A or UE B), a first sidelink (e.g., PC5 unicast link 1) associated with a first L2 identifier of the other UE (e.g., one of application layer ID 1 or 2) and a second sidelink (e.g., PC5 unicast link 2) associated with a second L2 identifier of the other UE (e.g., one of application layer ID 3 or 4). For example, the first UE and the second UE may establish the first sidelink and the second sidelink using the PC5 unicast link establishment procedure described above. Moreover, following the establishment of the first sidelink and the second sidelink, the first UE may receive an indication associating the second UE with the first L2 identifier and the second L2 identifier, which may include a physical node identifier associated with the second UE. For example, in some aspects, the indication associating the second UE with the first L2 identifier and the second L2 identifier (e.g., the indication associating the physical node identifier with the first L2 identifier and the second L2 identifier) may be received from the second UE, such as via the first sidelink and the second sidelink. Additionally, or alternatively, the indication associating the second UE with the first L2 identifier and the second L2 identifier may be received from another network entity, such as a base station or similar network entity, an anchor UE, a trusted third party, or the like. Accordingly, the pair of UEs may reduce signaling overhead or the like in a secure manner, resulting in decreased sidelink channel congestion and thus decreased latency, increased throughput, and overall efficient utilization of network resources.

As indicated above, FIG. 6 is provided as an example. Other examples may differ from what is described with regard to FIG. 6.

Figure 7:
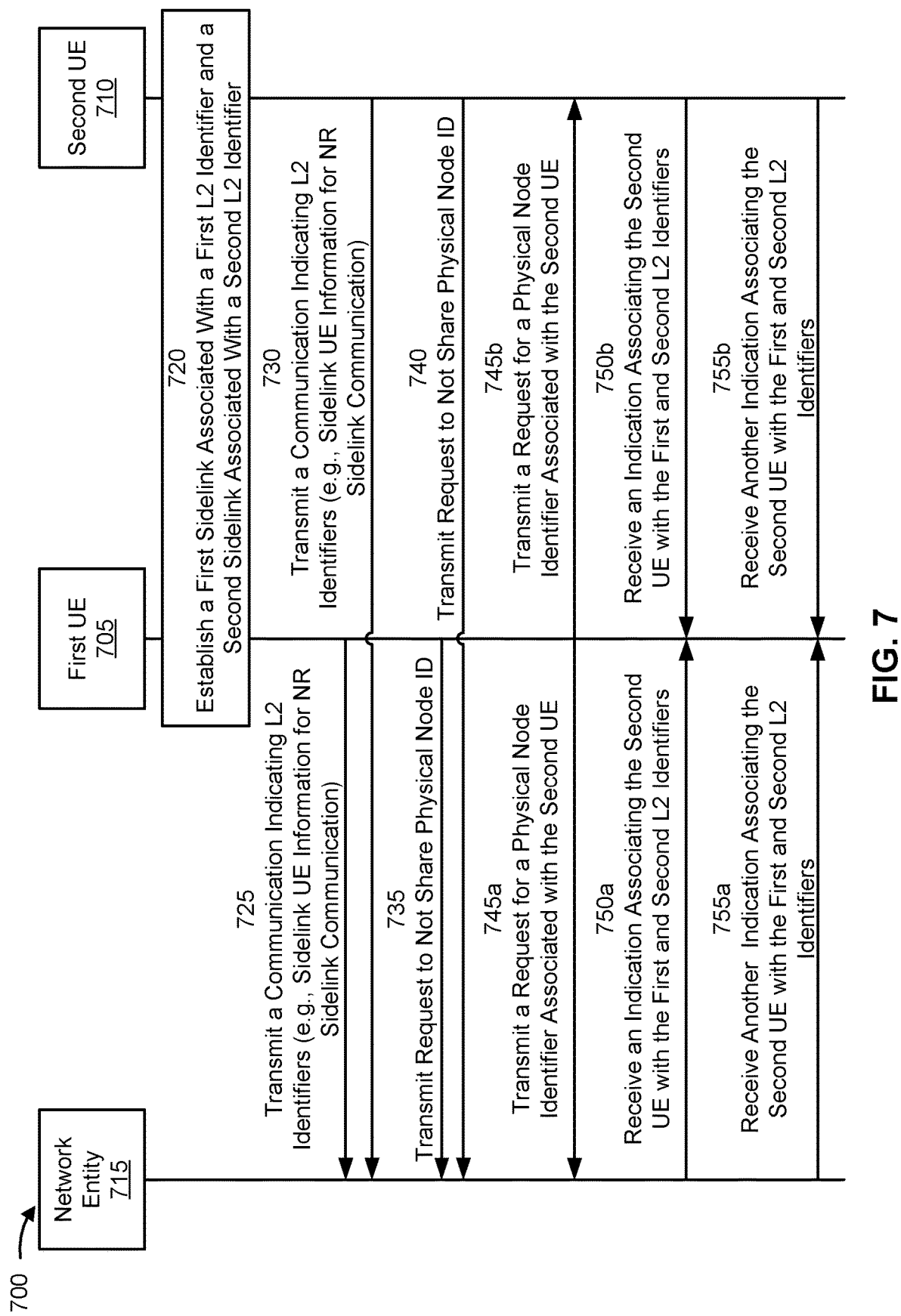
FIG. 7 is a diagram illustrating an example associated with indications associating layer 2 identifiers with a UE for sidelink, in accordance with the present disclosure.

FIG. 7 is a diagram illustrating an example 700 associated with indications associating L2 identifiers with a UE for sidelink, in accordance with the present disclosure. As shown in FIG. 7, a first UE 705, a second UE 710, and a network entity 715 may communicate with one another. In some aspects, the first UE 705 and/or the second UE 710 may correspond to one or more of the UE 120, the UE 405-1, the UE 405-2, the Tx/Rx UE 505, the Rx/Tx UE 510, UE A, UE B, or a similar UE. Moreover, the network entity 715 may correspond to or more of the base station 110, a CU 310, a DU 330, an RU 340, another UE, or a similar network entity.

As shown by reference number 720, in some aspects, the first UE 705 and the second UE 710 may establish multiple sidelinks (e.g., multiple PC5 unicast links). For example, the first UE 705 may establish, with the second UE 710, a first sidelink associated with a first L2 identifier (e.g., a first destination L2 identifier) of the second UE 710 and a second sidelink associated with a second L2 identifier (e.g., a second destination L2 identifier) of the second UE 710, wherein the first L2 identifier is different than the second L2 identifier. With respect to the example described in connection with FIG. 6, when the first UE 705 corresponds to UE A and the second UE 710 corresponds to UE B, the first sidelink may be the PC5 unicast link 1, the first L2 identifier may be application layer ID 2, the second sidelink may be the PC5 unicast link 2, and the second L2 identifier may be application layer ID 4. Moreover, and as described above in connection with FIG. 6, establishing the first and second sidelink may include, for each sidelink, one of the first UE 705 or the second UE 710 initiating a PC5 unicast link establishment procedure by transmitting a direct communication request message to the other UE using a default destination L2 identifier associated with a service type configured for unicast link establishment, and, in response, receiving a direct communication accept message. The respective L2 identifiers of the UEs 705, 710 may be exchanged during the PC5 unicast link establishment procedure using the direct communication request message and the direct communication accept message.

As will be described in more detail below in connection with reference numbers 750 and 755, in some aspects, the first UE 705 may receive, from the network entity 715, an indication associating the second UE 710 with the first L2 identifier and the second L2 identifier (reference numbers 750a and 755a), while, in some other aspects, the first UE 705 may receive the indication associating the second UE 710 with the first L2 identifier and the second L2 identifier from the second UE 710 (reference numbers 750b and 755b). In aspects in which the indication is received from the network entity 715, the first UE 705 and/or the second UE 710 may provide identifiers (e.g., L2 identifiers, physical node identifiers, or the like) to the network entity 715 such that the network entity 715 may correlate (e.g., map) L2 identifiers to respective physical node identifiers. That is, as shown by reference numbers 725 and 730, one or both of the first UE 705 and the second UE 710 may transmit, to the network entity 715, a communication indicating L2 identifiers.

For example, during the sidelink establishment procedure described in connection with reference number 720, the first UE 705 may have received the first L2 identifier as the destination L2 identifier for the first sidelink, and may have received the second L2 identifier as the destination L2 identifier for the second sidelink. As described above, however, at this time the first UE 705 may not know that the first L2 identifier and the second L2 identifier are both associated with the same UE (e.g., the second UE 710). As shown by reference number 725, the first UE 705 may thus transmit, to the network entity 715, a communication indicating the first L2 identifier and the second L2 identifier. Similarly, the second UE 710 may have received a third L2 identifier as the destination L2 identifier for the first sidelink, and may have received a fourth L2 identifier as the destination L2 identifier for the second sidelink. Again, at this time the second UE 710 may not know that the third L2 identifier and the fourth L2 identifier are both associated with the same UE (e.g., the first UE 705). As shown by reference number 730, the second UE 710 may thus transmit, to the network entity 715, a communication indicating the third L2 identifier and the fourth L2 identifier.

In some aspects, the communications described in connection with reference numbers 725 and 730 may each be associated with a "sidelink UE information for NR" sidelink communication message (sometimes referred to as SidelinkUEInformationNR). The sidelink UE information for NR sidelink communication message may be transmitted to a network entity (e.g., network entity 715) by a UE (e.g., the first UE 705 and/or the second UE 710) after establishing a sidelink in order to communicate certain parameters associated with the sidelink, to request resources for communicating on the sidelink, or the like. In some aspects, the sidelink UE information for NR sidelink communication message may further be used to indicate L2 identifiers associated with one or both of the UEs 705, 710, and/or identify a physical node identifier associated with one of the UEs 705, 710 such that the network entity 715 may map the L2 identifiers to a corresponding physical node identifier, or the like.

For example, the sidelink UE information for NR sidelink communication message may include a sidelink transmission resource requirement list (sometimes referred to as SL-TxResourceReqList). In such aspects, the L2 identifiers may be included in the resource requirement list. More particularly, for each resource request (sometimes referred to as SL-TxResourceReq) in the resource request list (e.g., SL-TxResourceReqList), the UE may include a destination L2 identifier for the corresponding sidelink. For example, in a sidelink UE information for NR sidelink communication message transmitted by the first UE 705, the first L2 identifier and the second L2 identifier may be indicated by the sidelink transmission resource requirement list (e.g., a first resource request may identify the first L2 identifier as the destination L2 identifier, and a second resource request may identify the second L2 identifier as the destination L2 identifier). Similarly, in a sidelink UE information for NR sidelink communication message transmitted by the second UE 710, the third L2 identifier and the fourth L2 identifier may be indicated by the sidelink transmission resource requirement list (e.g., a third resource request may identify the third L2 identifier as the destination L2 identifier, and a fourth resource request may identify the fourth L2 identifier as the destination L2 identifier).

In some aspects, the sidelink UE information for NR sidelink communication message or other indication transmitted to the network entity 715 may further include identifiers associated with the UE transmitting the message. For example, the communication indicating the first L2 identifier and the second L2 identifier sent by the first UE 705 (indicated by reference number 725) may further indicate the third L2 identifier of the first UE 705 associated with the first sidelink and the fourth L2 identifier of the first UE 705 associated with the second sidelink. Similarly, the communication indicating the third L2 identifier and the fourth L2 identifier sent by the second UE 710 (indicated by reference number 730) may further indicate the first L2 identifier of the second UE 710 associated with the first sidelink and the second L2 identifier of the second UE 710 associated with the second sidelink.

Moreover, in some aspects, a UE's source L2 identifier for a particular sidelink and the UE's destination L2 identifier for the particular sidelink may be the same L2 identifier, while, in some other aspects, the UE's source L2 identifier for the particular sidelink and the UE's destination L2 identifier for the particular sidelink may be different. In aspects in which a UE's source L2 identifier and destination L2 identifier are the same, depending on the traffic direction, the L2 identifier is used as a source L2 identifier or a destination L2 identifier. Accordingly, in such aspects, the L2 identifiers identified for each sidelink resource request (e.g., SL-TxResourceReq) in the resource request list (e.g., SL-TxResourceReqList) may be the other UE's destination identifier for the corresponding sidelink (sometimes referred to as sl-DestinationIdentity) as well as the transmitting UE's destination SL identifier for the corresponding sidelink. And in aspects in which a UE's source L2 identifier and destination L2 identifier are different, the source L2 identifier is used when a UE is transmitting in the sidelink, and the destination L2 identifier is used when the UE is receiving in sidelink. Accordingly, in such aspects, the L2 identifiers identified for each sidelink resource request (e.g., SL-TxResourceReq) in the resource request list (e.g., SL-TxResourceReqList) may be the other UE's destination L2 identifier for the corresponding sidelink, the other UE's source L2 identifier for the corresponding sidelink (sometimes referred to as sl-SourceIdentity), the transmitting UE's destination L2 identifier for the corresponding sidelink, and the transmitting UE's source L2 identifier for the corresponding sidelink.

Moreover, each communication indicated by reference numbers 725 and 730 may indicate a physical node identifier (sometimes referred to as PhysicalNodeID) associated with each respective UE 705, 710. For example, the communication transmitted by the first UE 705, indicated by reference number 725, may indicate a physical node identifier of the first UE 705, and the communication transmitted by the second UE 710, indicated by reference number 730, may indicate a physical node identifier of the second UE 710. In some aspects, the physical node identifier is assigned to the respective UE 705, 710 by a network entity, such as the network entity 715 or another network entity (e.g., a base station 110, a CU 310, a DU 330, an RU 340, an anchor UE, a trusted third party, or the like). In some other aspects, the physical node identifier is generated locally by each respective UE 705, 710. In some aspects, the physical node identifier may be a random number that uniquely identifies the respective UE 705, 710. For example, the physical node identifier may be a random number generated as a function of at least one of a cell radio network temporary identifier (C-RNTI) associated with the UE 705, 710 (e.g., a C-RNTI associated with an access link of the UE 705, 710), a location identifier associated with the UE 705, 710 (e.g., a sidelink zone identifier or the like), an international mobile subscriber identity (IMSI) associated with the UE 705, 710, an international mobile equipment identity (IMEI) associated with the UE 705, 710, or a similar identifier associated with the UE 705, 710. In this way, the network entity 715 may receive the physical node identifiers of each UE 705, 710 and L2 identifiers associated with sidelinks at each UE 705, 710, and the network entity 715 may map physical node identifiers to L2 identifiers (e.g., associate a physical node identifier of the second UE 710 with the first L2 identifier and the second L2 identifier, and/or associate a physical node identifier of the first UE 705 with the third L2 identifier and the fourth L2 identifier).

In some aspects, as described in more detail below in connection with reference numbers 750*a* and 755*a*, the network entity 715 may transmit an indication to one or both UEs 705, 710 associating a UE with certain L2 identifiers. In such aspects, however, a UE may be able to indicate to the network entity 615 that a physical node identifier of the UE should not be shared with other UEs for security or privacy reasons, or the like. More particularly, as shown by reference number 735, the first UE 705 may transmit, to the network entity 715, an indication that the network entity 715 is not permitted to share one or more L2 identifiers associated with the first UE 705 with other UEs (e.g., the second UE 710). Similarly, as shown by reference number 740, the second UE 710 may transmit, to the network entity 715, an indication that the network entity 715 is not permitted to share one or more L2 identifiers associated with the second UE 710 with other UEs (e.g., the first UE 705). In some aspects, the indications shown by reference numbers 735 and 740 may be included with the communications described in connection with reference numbers 725 and 730. For example, the communications described in connection with reference numbers 725 and 730 may include a flag or the like (e.g., a one-bit indication or the like) indicating whether the UE's L2 identifiers included in a subset of the sidelink resource requirement entries (e.g., SL-TxResourceReq) of the sidelink resource requirement list (e.g., SL-TxResourceReqList) may be provided to other UEs.

In some aspects, the first UE 705 may be provided an indication associating the second UE 710 with the first L2 identifier and the second L2 identifier automatically and/or as a matter of course, while, in some other aspects, the first UE 705 may need to transmit a request and/or query to receive the indication, as shown by reference numbers 745*a* and 745*b*. More particularly, when the first UE 705 needs to transmit a request and/or query to receive the indication, the first UE 705 may transmit, to the network entity 715 (reference number 745*a*) and/or the second UE 710 (reference number 745*b*), a request for a physical node identifier (e.g., PhysicalNodeID) associated with the second UE 710.

As shown as reference numbers 750*a* and 750*b*, the first UE 705 may receive an indication associating the second UE 710 with the first L2 identifier and the second L2 identifier. In some aspects, the indication associating the second UE 710 with the first L2 identifier and the second L2 identifier may be received from the network entity (reference number 750*a*), while, in some other aspects, the indication associating the second UE 710 with the first L2 identifier and the second L2 identifier may be received via a unicast sidelink communication from the second UE 710 (reference number 750*b*). In some aspects, the indication associating the other UE with the first L2 identifier and the second L2 identifier indicates the physical node identifier of the second UE 710, as described above. Moreover, in aspects in which the first UE 705 requested the physical node identifier associated with the second UE 710, as described in connection with reference numbers 745*a* and 745*b*, the indication associating the second UE 710 with the first L2 identifier and the second L2 identifier may be received from the network entity 715 and/or the second UE 710 in response to the request for the physical node identifier associated with the second UE 710.

In aspects in which the indication shown by reference numbers 750*a* and 750*b* is received from the second UE 710, the indication associating the second UE 710 with the first L2 identifier and the second L2 identifier may be associated with a sidelink RRC communication. Moreover, in some aspects, the indication shown by reference number 750*b* may be received via multiple messages over multiple sidelinks, such as over the first sidelink and the second sidelink. More particularly, the first UE 705 may receive, from the second UE 710, a first message associating the second UE 710 with the first L2 identifier via the first sidelink, and a second message associating the second UE 710 with the second L2 identifier via the second sidelink. For example, the first message may include the physical node identifier of the second UE 710 as well as the first L2 identifier, while the second message may include the physical node identifier of the second UE 710 as well as the second L2 identifier. In this regard, the first UE 705 may be able to determine that the first sidelink and the second sidelink are between the same pair of UEs because the physical node identifier included in the first message will match the physical node identifier included in the second message.

Moreover, in some aspects, for security or privacy reasons, or the like, the second UE 710 may not wish to indicate its physical node identifier (e.g., may not wish for other UEs, such as the first UE 705, to know that the first sidelink and the second sidelink are associated with the same UE). Accordingly, in such aspects, the second UE 710 may omit the physical node identifier from the first message and/or the second message. Similarly, for aspects in which the first UE 705 has not received a physical node identifier for a particular sidelink, the first UE 705 may transmit a request or query (via the corresponding sidelink) to the second UE 710 requesting the physical node identifier, as described above in connection with reference number 745*b*. Put another way, the first UE 705 may transmit, to the second UE 710, a request for a physical node identifier associated with the second UE 710, and the indication associating the second UE 710 with the first L2 identifier and the second L2 identifier may be received from the second UE 710 in response to the request for the physical node identifier associated with the second UE 710.

In aspects in which the indication shown by reference numbers 750*a* and 750*b* is received from the network entity 715, the indication associating the second UE 710 with the first L2 identifier and the second L2 identifier may be received via one of a MAC control element (MAC-CE) communication or an RRC communication. Moreover, the indication associating the second UE 710 with the first L2 identifier and the second L2 identifier may be received in response to the first UE 705 transmitting a communication to the network entity 715 identifying the first L2 identifier and the second L2 identifier. For example, as described above, the first UE 705 may transmit, to the network entity 715, a sidelink UE information for NR sidelink communication message or similar message indicating the first L2 identifier and the second L2 identifier. Accordingly, the indication associating the second UE 710 with the first L2 identifier and the second L2 identifier may be received from the network entity 715 in response to the communication identifying the first L2 identifier and the second L2 identifier.

Additionally, or alternatively, the first UE 705 may transmit, to the network entity 715, a request for a physical node identifier associated with the second UE 710 (as described above in connection with reference number 745*a*), and the indication associating the second UE 710 with the first L2 identifier and the second L2 identifier may be received from the network entity 715 in response to the request for the physical node identifier associated with the second UE 715. Moreover, in aspects in which the second UE 710's source L2 identifier for each sidelink differs from the second UE 710's destination L2 identifier for the respective sidelink, the indication associating the second UE 710 with the first L2 identifier and the second L2 identifier may indicate both source L2 identifiers of the second UE 710 for each sidelink and destination L2 identifiers of the second UE 710 for each sidelink.

In some aspects, UEs communicating via one or more sidelinks may be in communication with different network entities via respective access links. For example, the first UE 705 may be in communication with the network entity 715 via a first access link, while the second UE 710 may be in communication with another network entity via a second access link. In such aspects, there may be inter-network entity coordination in order to provide the first UE 705 with the indication associating the second UE 710 with the first L2 identifier and the second L2 identifier. For example, the network entity 715 may receive, from the other network entity, an indication of the physical node identifier of the second UE 710 and/or an indication that the first L2 identifier and the second L2 identifier are associated with the physical node identifier of the second UE 710. Using the indication provided from the first UE 705, the second UE 710, and/or other network entities, the network entity 715 may map various L2 identifiers to corresponding physical node identifiers, and provide indications associating L2 identifiers with physical node identifiers, such as the indication described in connection with reference number 750*a*.

In some aspects, as indicated by reference numbers 755*a* and 755*b*, the first UE 705 may receive another indication associating the second UE 710 with the first L2 identifier and the second L2 identifier. For example, if the second UE 710 changes one or more L2 identifiers and/or its physical node identifier, the first UE 710 may receive, either from the network entity 715 (reference number 755*a*) or from the second UE 710 (reference number 755*b*), another indication associating the changed identifiers with the second UE 710. Put another way, based at least in part on the second UE 710 changing at least one of the physical node identifier, the first L2 identifier, or the second L2 identifier, the first UE 705 may receive another indication associating the second UE 710 with the first L2 identifier and the second L2 identifier.

As indicated above, FIG. 7 is provided as an example. Other examples may differ from what is described with respect to FIG. 7.

Figure 8:
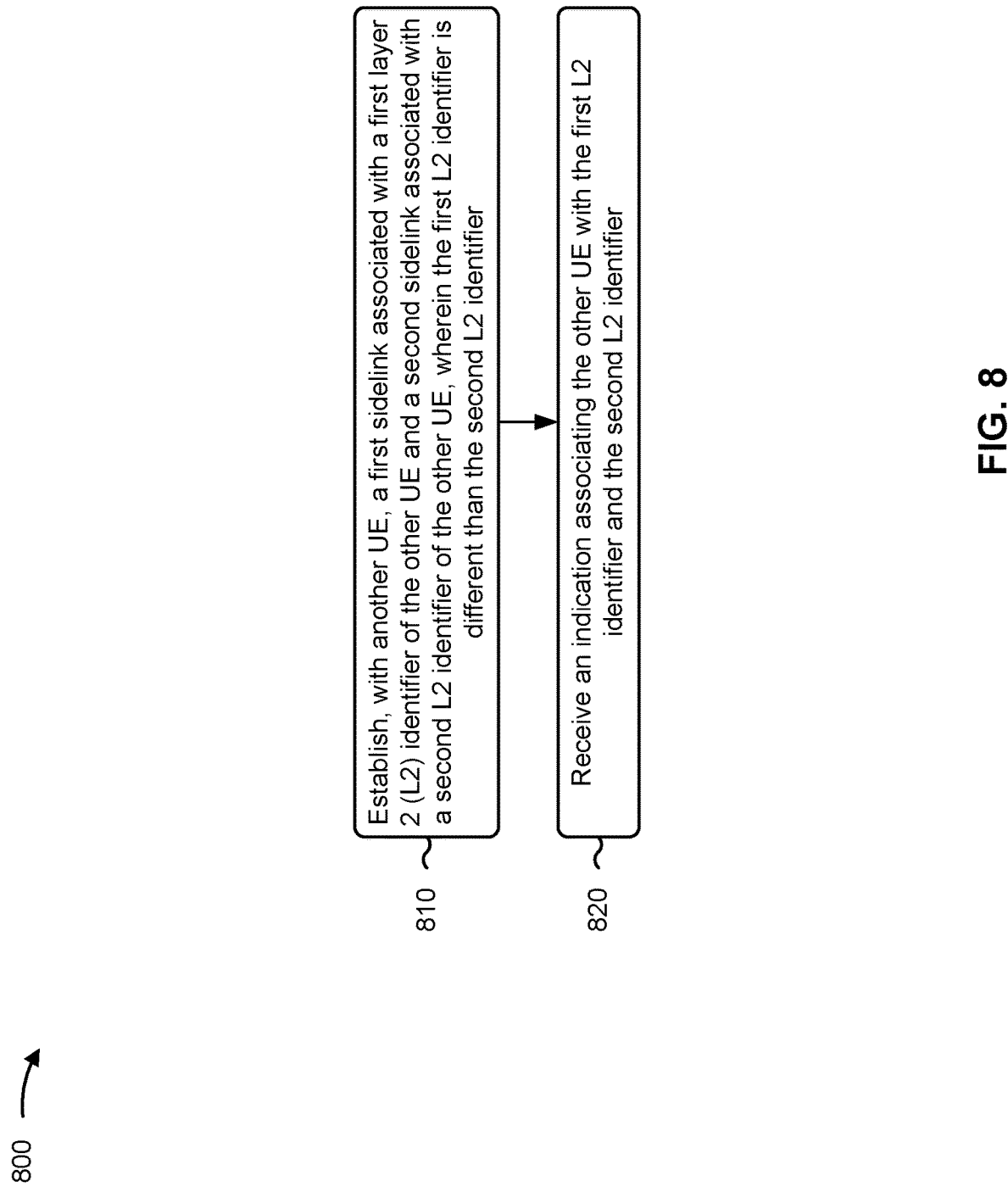
FIG. 8 is a diagram illustrating an example process performed, for example, by a UE, in accordance with the present disclosure.

FIG. 8 is a diagram illustrating an example process 800 performed, for example, by a first UE, in accordance with the present disclosure. Example process 800 is an example where the first UE (e.g., the first UE 705) performs operations associated with indications associating L2 identifiers with a UE for sidelink.

As shown in FIG. 8, in some aspects, process 800 may include establishing, with a second UE (e.g., the second UE 710), a first sidelink associated with a first L2 identifier of the second UE and a second sidelink associated with a second L2 identifier of the second UE, wherein the first L2 identifier is different than the second L2 identifier (block 810). For example, the first UE (e.g., using communication manager 1008 and/or sidelink establishment component 1010, depicted in FIG. 10) may establish, with a second UE, a first sidelink associated with a first L2 identifier of the second UE and a second sidelink associated with a second L2 identifier of the second UE, wherein the first L2 identifier is different than the second L2 identifier, as described above.

As further shown in FIG. 8, in some aspects, process 800 may include receiving an indication associating the second UE with the first L2 identifier and the second L2 identifier (block 820). For example, the first UE (e.g., using communication manager 1008 and/or reception component 1002, depicted in FIG. 10) may receive an indication associating the second UE with the first L2 identifier and the second L2 identifier, as described above.

Process 800 may include additional aspects, such as any single aspect or any combination of aspects described below and/or in connection with one or more other processes described elsewhere herein.

In a first aspect, the indication associating the second UE with the first L2 identifier and the second L2 identifier indicates a physical node identifier of the second UE.

In a second aspect, alone or in combination with the first aspect, the physical node identifier is assigned to the first UE by a network entity or generated locally by the first UE.

In a third aspect, alone or in combination with one or more of the first and second aspects, the physical node identifier is a random number generated as a function of at least one of a C-RNTI associated with the second UE, a location identifier associated with the second UE, an IMSI associated with the second UE, or an IMEI associated with the second UE.

In a fourth aspect, alone or in combination with one or more of the first through third aspects, process 800 includes, based at least in part on the second UE changing at least one of the physical node identifier, the first L2 identifier, or the second L2 identifier, receiving another indication associating the second UE with the first L2 identifier and the second L2 identifier.

In a fifth aspect, alone or in combination with one or more of the first through fourth aspects, the indication associating the second UE with the first L2 identifier and the second L2 identifier is received via a unicast sidelink communication from the second UE.

In a sixth aspect, alone or in combination with one or more of the first through fifth aspects, the indication associating the second UE with the first L2 identifier and the second L2 identifier is associated with a sidelink RRC communication.

In a seventh aspect, alone or in combination with one or more of the first through sixth aspects, the indication associating the second UE with the first L2 identifier and the second L2 identifier includes a first message received via the first sidelink associating the second UE with the first L2 identifier, and a second message received via the second sidelink associating the second UE with the second L2 identifier.

In an eighth aspect, alone or in combination with one or more of the first through seventh aspects, process 800 includes transmitting, to the second UE, a request for a physical node identifier associated with the second UE, wherein the indication associating the second UE with the first L2 identifier and the second L2 identifier is received from the second UE in response to the request for the physical node identifier associated with the second UE.

In a ninth aspect, alone or in combination with one or more of the first through eighth aspects, the indication associating the second UE with the first L2 identifier and the second L2 identifier is received from a network entity.

In a tenth aspect, alone or in combination with one or more of the first through ninth aspects, process 800 includes transmitting, to the network entity, a communication indicating the first L2 identifier and the second L2 identifier, wherein the indication associating the second UE with the first L2 identifier and the second L2 identifier is received from the network entity in response to the communication identifying the first L2 identifier and the second L2 identifier.

In an eleventh aspect, alone or in combination with one or more of the first through tenth aspects, the communication indicating the first L2 identifier and the second L2 identifier is associated with a sidelink UE information for NR sidelink communication message.

In a twelfth aspect, alone or in combination with one or more of the first through eleventh aspects, the sidelink UE information for NR sidelink communication message includes a sidelink transmission resource requirement list, and the first L2 identifier and the second L2 identifier are indicated by the sidelink transmission resource requirement list.

In a thirteenth aspect, alone or in combination with one or more of the first through twelfth aspects, the communication indicating the first L2 identifier and the second L2 identifier further indicates a third L2 identifier of the first UE associated with the first sidelink and a fourth L2 identifier of the first UE associated with the second sidelink.

In a fourteenth aspect, alone or in combination with one or more of the first through thirteenth aspects, the indication associating the second UE with the first L2 identifier and the second L2 identifier is received via at least one of a MAC-CE communication or an RRC communication.

In a fifteenth aspect, alone or in combination with one or more of the first through fourteenth aspects, process 800 includes transmitting, to the network entity, an indication that the network entity is not permitted to share one or more L2 identifiers associated with the first UE with the second UE.

In a sixteenth aspect, alone or in combination with one or more of the first through fifteenth aspects, process 800 includes transmitting, to the network entity, a request for a physical node identifier associated with the second UE, wherein the indication associating the second UE with the first L2 identifier and the second L2 identifier is received from the network entity in response to the request for the physical node identifier associated with the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
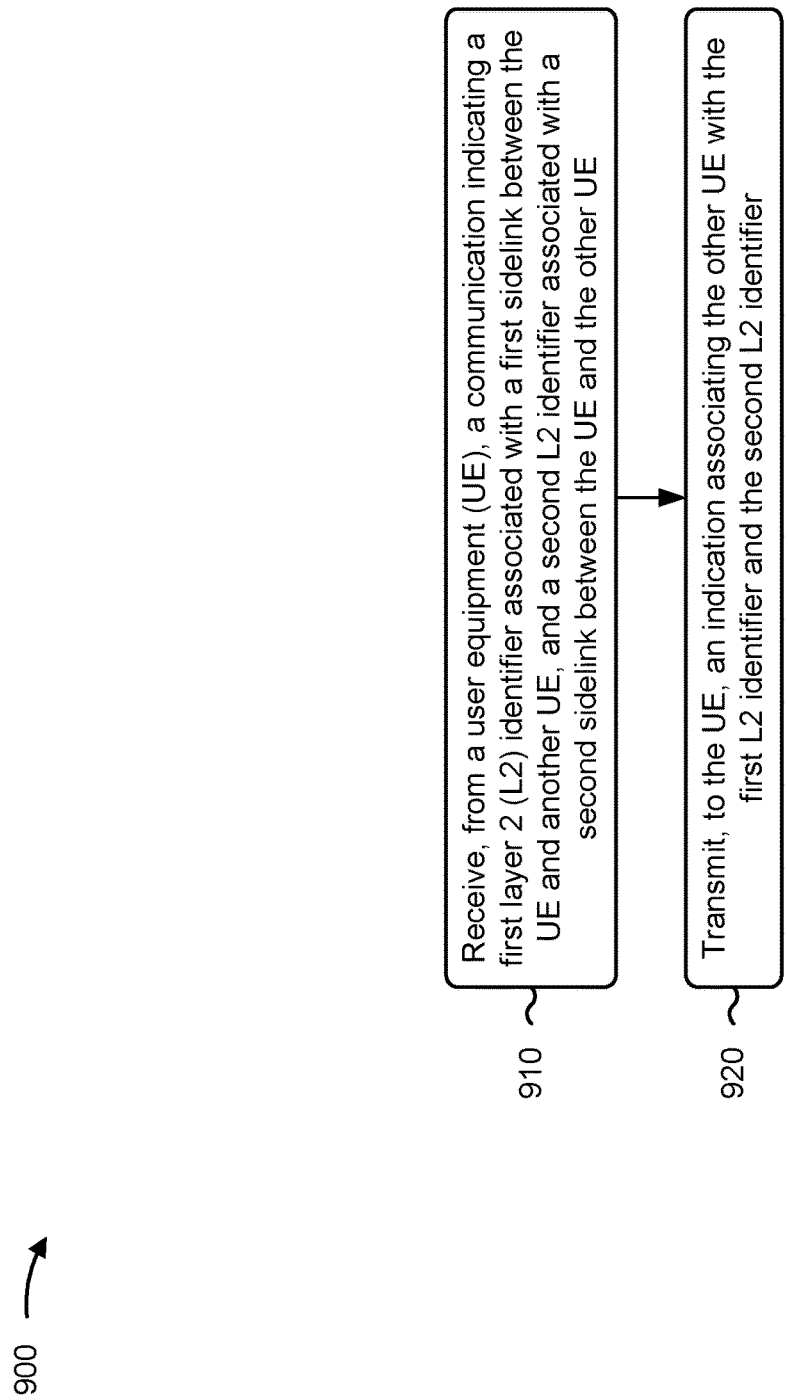
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., network entity 715) performs operations associated with indications associating L2 identifiers with a UE for sidelink.

As shown in FIG. 9, in some aspects, process 900 may include receiving, from a first UE (e.g., the first UE 705), a communication indicating a first L2 identifier associated with a first sidelink between the first UE and a second UE (e.g., the second UE 710), and a second L2 identifier associated with a second sidelink between the first UE and the second UE (block 910). For example, the network entity (e.g., using communication manager 1108 and/or reception component 1102, depicted in FIG. 11) may receive, from a UE, a communication indicating a first L2 identifier associated with a first sidelink between the first UE and a second UE, and a second L2 identifier associated with a second sidelink between the first UE and the second UE, as described above.

As further shown in FIG. 9, in some aspects, process 900 may include transmitting, to the first UE, an indication associating the second UE with the first L2 identifier and the second L2 identifier (block 920). For example, the network entity (e.g., using communication manager 1108 and/or transmission component 1104, depicted in FIG. 11) may transmit, to the first UE, an indication associating the second UE with the first L2 identifier and the second L2 identifier, as described above.

Process 900 may include additional aspects, such as any single aspect or any combination of aspects described below and/or in connection with one or more other processes described elsewhere herein.

In a first aspect, associating the second UE with the first L2 identifier and the second L2 identifier indicates a physical node identifier of the second UE.

In a second aspect, alone or in combination with the first aspect, the physical node identifier is assigned to the first UE by a network entity or generated locally by the first UE.

In a third aspect, alone or in combination with one or more of the first and second aspects, the physical node identifier is a random number generated as a function of at least one of a C-RNTI associated with the second UE, a location identifier associated with the second UE, an IMSI associated with the second UE, or an IMEI associated with the second UE.

In a fourth aspect, alone or in combination with one or more of the first through third aspects, process 900 includes, based at least in part on the second UE changing at least one of the physical node identifier, the first L2 identifier, or the second L2 identifier, transmitting, to the first UE, another indication associating the second UE with the first L2 identifier and the second L2 identifier.

In a fifth aspect, alone or in combination with one or more of the first through fourth aspects, the communication indicating the first L2 identifier and the second L2 identifier is associated with a sidelink UE information for NR sidelink communication message.

In a sixth aspect, alone or in combination with one or more of the first through fifth aspects, the sidelink UE information for NR sidelink communication message includes a sidelink transmission resource requirement list, and the first L2 identifier and the second L2 identifier are indicated by the sidelink transmission resource requirement list.

In a seventh aspect, alone or in combination with one or more of the first through sixth aspects, the communication indicating the first L2 identifier and the second L2 identifier further indicates a third L2 identifier of the first UE associated with the first sidelink and a fourth L2 identifier of the first UE associated with the second sidelink.

In an eighth aspect, alone or in combination with one or more of the first through seventh aspects, process 900 includes transmitting, to the second UE, an indication associating the first UE with the third L2 identifier and the fourth L2 identifier.

In a ninth aspect, alone or in combination with one or more of the first through eighth aspects, the indication associating the second UE with the first L2 identifier and the second L2 identifier is transmitted via at least one of a MAC-CE communication or an RRC communication.

In a tenth aspect, alone or in combination with one or more of the first through ninth aspects, process 900 includes receiving, from the first UE, an indication that the network entity is not permitted to share one or more L2 identifiers associated with the first UE with the second UE.

In an eleventh aspect, alone or in combination with one or more of the first through tenth aspects, process 900 includes receiving, from the first UE, a request for a physical node identifier associated with the second UE, wherein the indication associating the second UE with the first L2 identifier and the second L2 identifier is transmitted to the first UE in response to the request for the physical node identifier associated with the second UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
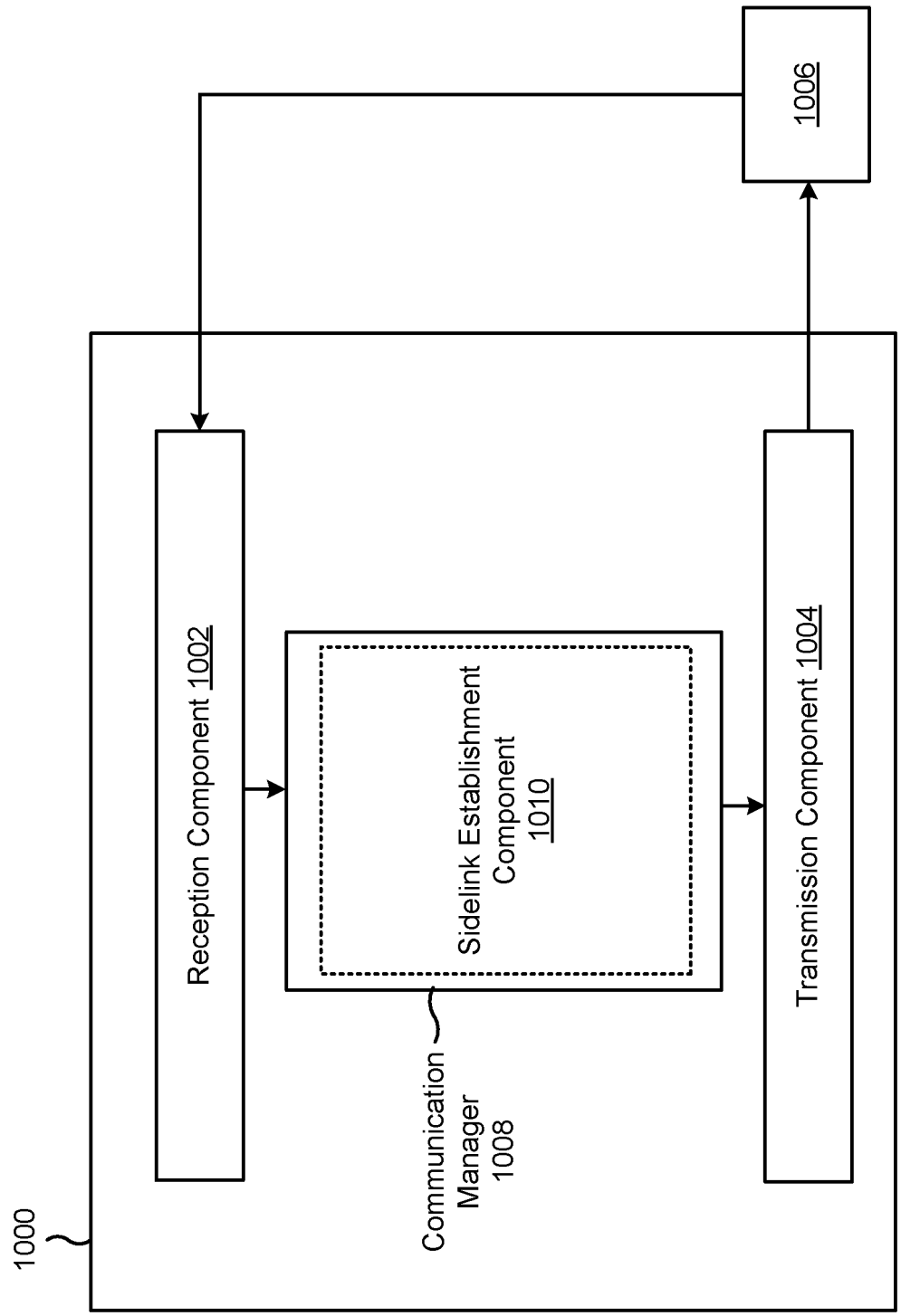
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE (e.g., the first UE 705), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 140). The communication manager 1008 may include a sidelink establishment component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE 120 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE 120 described in connection with FIG. 2. In some aspects, the transmission component 1004 may be co-located with the reception component 1002 in a transceiver.

The sidelink establishment component 1010 may establish, with another UE, a first sidelink associated with a first L2 identifier of the other UE and a second sidelink associated with a second L2 identifier of the other UE, wherein the first L2 identifier is different than the second L2 identifier. The reception component 1002 may receive an indication associating the other UE with the first L2 identifier and the second L2 identifier.

The transmission component 1004 may transmit, to the other UE, a request for a physical node identifier associated with the other UE, wherein the indication associating the other UE with the first L2 identifier and the second L2 identifier is received from the other UE in response to the request for the physical node identifier associated with the other UE.

The transmission component 1004 may transmit, to the network entity, a communication indicating the first L2 identifier and the second L2 identifier, wherein the indication associating the other UE with the first L2 identifier and the second L2 identifier is received from the network entity in response to the communication identifying the first L2 identifier and the second L2 identifier.

The transmission component 1004 may transmit, to the network entity, an indication that the network entity is not permitted to share one or more L2 identifiers associated with the UE with the other UE.

The transmission component 1004 may transmit, to the network entity, a request for a physical node identifier associated with the other UE, wherein the indication associating the other UE with the first L2 identifier and the second L2 identifier is received from the network entity in response to the request for the physical node identifier associated with the other UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
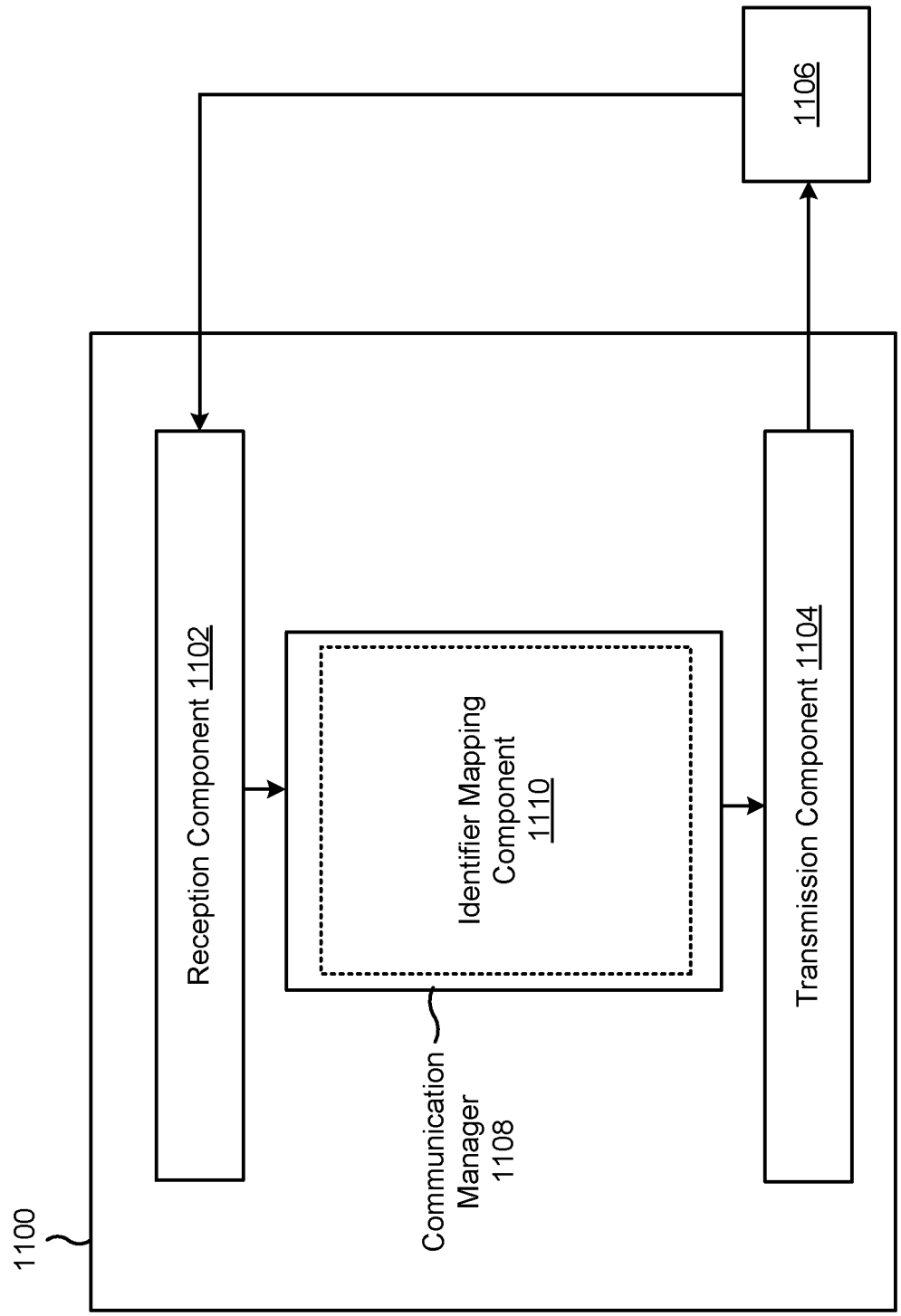
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network entity (e.g., network entity 715), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108 (e.g., communication manager 150). The communication manager 1108 may include an identifier mapping component 1110, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station 110 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station 110 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station 110 described in connection with FIG. 2. In some aspects, the transmission component 1104 may be co-located with the reception component 1102 in a transceiver.

The reception component 1102 may receive, from a UE (e.g., the first UE 705), a communication indicating a first L2 identifier associated with a first sidelink between the UE and another UE (e.g., the second UE 710), and a second L2 identifier associated with a second sidelink between the UE and the other UE. The transmission component 1104 and/or the identifier mapping component 1110 may transmit, to the UE, an indication associating the other UE with the first L2 identifier and the second L2 identifier.

The transmission component 1104 and/or the identifier mapping component 1110 may transmit, to the other UE, an indication associating the UE with the third L2 identifier and the fourth L2 identifier.

The reception component 1102 may receive, from the UE, an indication that the network entity is not permitted to share one or more L2 identifiers associated with the UE with the other UE.

The reception component 1102 may receive, from the UE, a request for a physical node identifier associated with the other UE, wherein the indication associating the other UE with the first L2 identifier and the second L2 identifier is transmitted to the UE in response to the request for the physical node identifier associated with the other UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first UE, comprising: establishing, with a second UE, a first sidelink associated with a first L2 identifier of the second UE and a second sidelink associated with a second L2 identifier of the second UE, wherein the first L2 identifier is different than the second L2 identifier; and receiving an indication associating the second UE with the first L2 identifier and the second L2 identifier.

Aspect 2: The method of Aspect 1, wherein the indication associating the second UE with the first L2 identifier and the second L2 identifier indicates a physical node identifier of the second UE.

Aspect 3: The method of Aspect 2, wherein the physical node identifier is assigned to the first UE by a network entity or generated locally by the first UE.

Aspect 4: The method of any of Aspects 2-3, wherein the physical node identifier is a random number generated as a function of at least one of a C-RNTI associated with the second UE, a location identifier associated with the second UE, an IMSI associated with the second UE, or an IMEI associated with the second UE.

Aspect 5: The method of any of Aspects 2-4, further comprising, based at least in part on the second UE changing at least one of the physical node identifier, the first L2 identifier, or the second L2 identifier, receiving another indication associating the second UE with the first L2 identifier and the second L2 identifier.

Aspect 6: The method of any of Aspects 1-5, wherein the indication associating the second UE with the first L2 identifier and the second L2 identifier is received via a unicast sidelink communication from the second UE.

Aspect 7: The method of Aspect 6, wherein the indication associating the second UE with the first L2 identifier and the second L2 identifier is associated with a sidelink RRC communication.

Aspect 8: The method of any of Aspects 6-7, wherein the indication associating the second UE with the first L2 identifier and the second L2 identifier includes a first message received via the first sidelink associating the second UE with the first L2 identifier, and a second message received via the second sidelink associating the second UE with the second L2 identifier.

Aspect 9: The method of any of Aspects 6-8, further comprising transmitting, to the second UE, a request for a physical node identifier associated with the second UE, wherein the indication associating the second UE with the first L2 identifier and the second L2 identifier is received from the second UE in response to the request for the physical node identifier associated with the second UE.

Aspect 10: The method of any of Aspects 1-5, wherein the indication associating the second UE with the first L2 identifier and the second L2 identifier is received from a network entity.

Aspect 11: The method of Aspect 10, further comprising transmitting, to the network entity, a communication indicating the first L2 identifier and the second L2 identifier, wherein the indication associating the second UE with the first L2 identifier and the second L2 identifier is received from the network entity in response to the communication identifying the first L2 identifier and the second L2 identifier.

Aspect 12: The method of Aspect 11, wherein the communication indicating the first L2 identifier and the second L2 identifier is associated with a sidelink UE information for NR sidelink communication message.

Aspect 13: The method of Aspect 12, wherein the sidelink UE information for NR sidelink communication message includes a sidelink transmission resource requirement list, and wherein the first L2 identifier and the second L2 identifier are indicated by the sidelink transmission resource requirement list.

Aspect 14: The method of any of Aspects 11-13, wherein the communication indicating the first L2 identifier and the second L2 identifier further indicates a third L2 identifier of the first UE associated with the first sidelink and a fourth L2 identifier of the first UE associated with the second sidelink.

Aspect 15: The method of any of Aspects 10-14, wherein the indication associating the second UE with the first L2 identifier and the second L2 identifier is received via at least one of a MAC-CE communication or an RRC communication.

Aspect 16: The method of any of Aspects 10-15, further comprising transmitting, to the network entity, an indication that the network entity is not permitted to share one or more L2 identifiers associated with the first UE with the second UE.

Aspect 17: The method of any of Aspects 10-16, further comprising transmitting, to the network entity, a request for a physical node identifier associated with the second UE, wherein the indication associating the second UE with the first L2 identifier and the second L2 identifier is received from the network entity in response to the request for the physical node identifier associated with the second UE.

Aspect 18: A method of wireless communication performed by a network entity, comprising: receiving, from a UE, a communication indicating a first L2 identifier associated with a first sidelink between the first UE and a second UE, and a second L2 identifier associated with a second sidelink between the first UE and the second UE; and transmitting, to the first UE, an indication associating the second UE with the first L2 identifier and the second L2 identifier.

Aspect 19: The method of Aspect 18, wherein the indication associating the second UE with the first L2 identifier and the second L2 identifier indicates a physical node identifier of the second UE.

Aspect 20: The method of Aspect 19, wherein the physical node identifier is assigned to the first UE by a network entity or generated locally by the first UE.

Aspect 21: The method of any of Aspects 19-20, wherein the physical node identifier is a random number generated as a function of at least one of a C-RNTI associated with the second UE, a location identifier associated with the second UE, an IMSI associated with the second UE, or an IMEI associated with the second UE.

Aspect 22: The method of any of Aspects 19-21, further comprising, based at least in part on the second UE changing at least one of the physical node identifier, the first L2 identifier, or the second L2 identifier, transmitting, to the first UE, another indication associating the second UE with the first L2 identifier and the second L2 identifier.

Aspect 23: The method of any of Aspects 18-22, wherein the communication indicating the first L2 identifier and the second L2 identifier is associated with a sidelink UE information for NR sidelink communication message.

Aspect 24: The method of Aspect 23, wherein the sidelink UE information for NR sidelink communication message includes a sidelink transmission resource requirement list, and wherein the first L2 identifier and the second L2 identifier are indicated by the sidelink transmission resource requirement list.

Aspect 25: The method of any of Aspects 18-24, wherein the communication indicating the first L2 identifier and the second L2 identifier further indicates a third L2 identifier of the first UE associated with the first sidelink and a fourth L2 identifier of the first UE associated with the second sidelink.

Aspect 26: The method of Aspect 25, further comprising transmitting, to the second UE, an indication associating the first UE with the third L2 identifier and the fourth L2 identifier.

Aspect 27: The method of any of Aspects 18-26, wherein the indication associating the second UE with the first L2 identifier and the second L2 identifier is transmitted via at least one of a MAC-CE communication or an RRC communication.

Aspect 28: The method of any of Aspects 18-27, further comprising receiving, from the first UE, an indication that the network entity is not permitted to share one or more L2 identifiers associated with the first UE with the second UE.

Aspect 29: The method of any of Aspects 18-28, further comprising receiving, from the first UE, a request for a physical node identifier associated with the second UE, wherein the indication associating the second UE with the first L2 identifier and the second L2 identifier is transmitted to the first UE in response to the request for the physical node identifier associated with the second UE.

Aspect 30: An apparatus for wireless communication at a device, comprising a processor; memory coupled with the processor; and instructions stored in the memory and executable by the processor to cause the apparatus to perform the method of one or more of Aspects 1-17.

Aspect 31: A device for wireless communication, comprising a memory and one or more processors coupled to the memory, the one or more processors configured to perform the method of one or more of Aspects 1-17.

Aspect 32: An apparatus for wireless communication, comprising at least one means for performing the method of one or more of Aspects 1-17.

Aspect 33: A non-transitory computer-readable medium storing code for wireless communication, the code comprising instructions executable by a processor to perform the method of one or more of Aspects 1-17.

Aspect 34: A non-transitory computer-readable medium storing a set of instructions for wireless communication, the set of instructions comprising one or more instructions that, when executed by one or more processors of a device, cause the device to perform the method of one or more of Aspects 1-17.

Aspect 35: An apparatus for wireless communication at a device, comprising a processor; memory coupled with the processor; and instructions stored in the memory and executable by the processor to cause the apparatus to perform the method of one or more of Aspects 18-29.

Aspect 36: A device for wireless communication, comprising a memory and one or more processors coupled to the memory, the one or more processors configured to perform the method of one or more of Aspects 18-29.

Aspect 37: An apparatus for wireless communication, comprising at least one means for performing the method of one or more of Aspects 18-29.

Aspect 38: A non-transitory computer-readable medium storing code for wireless communication, the code comprising instructions executable by a processor to perform the method of one or more of Aspects 18-29.

Aspect 39: A non-transitory computer-readable medium storing a set of instructions for wireless communication, the set of instructions comprising one or more instructions that, when executed by one or more processors of a device, cause the device to perform the method of one or more of Aspects 18-29.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors coupled to the one or more memories, the one or more memories comprising instructions executable by the one or more processors to cause the apparatus to:
      establish, with a second UE, a first sidelink associated with a first layer 2 (L2) identifier of the second UE and a second sidelink associated with a second L2 identifier of the second UE, wherein the first L2 identifier is different than the second L2 identifier;
      transmit an indication that one or more L2 identifiers associated with the first UE are not permitted to be shared with the second UE; and
      receive an indication associating the second UE with the first L2 identifier and the second L2 identifier.

2. The apparatus of claim 1, wherein the indication associating the second UE with the first L2 identifier and the second L2 identifier indicates a physical node identifier of the second UE.

3. The apparatus of claim 2, wherein the physical node identifier is assigned to the first UE by a network entity or generated locally by the first UE.

4. The apparatus of claim 2, wherein the physical node identifier is an international mobile subscriber identity (IMSI) associated with the second UE, or an international mobile equipment identity (IMEI) associated with the second UE.

5. The apparatus of claim 2, wherein the one or more processors are further configured to, based at least in part on the second UE changing at least one of the physical node identifier, the first L2 identifier, or the second L2 identifier, receive another indication associating the second UE with the first L2 identifier and the second L2 identifier.

6. The apparatus of claim 1, wherein the indication associating the second UE with the first L2 identifier and the second L2 identifier is received via a unicast sidelink communication from the second UE.

7. The apparatus of claim 6, wherein the indication associating the second UE with the first L2 identifier and the second L2 identifier is associated with a sidelink radio resource control (RRC) communication.

8. The apparatus of claim 6, wherein the indication associating the second UE with the first L2 identifier and the second L2 identifier includes a first message received via the first sidelink associating the second UE with the first L2 identifier, and a second message received via the second sidelink associating the second UE with the second L2 identifier.

9. The apparatus of claim 6, wherein the one or more processors are further configured to transmit, to the second UE, a request for a physical node identifier associated with the second UE, wherein the indication associating the second UE with the first L2 identifier and the second L2 identifier is received from the second UE in response to the request for the physical node identifier associated with the second UE.

10. The apparatus of claim 1, wherein the indication associating the second UE with the first L2 identifier and the second L2 identifier is received from a network entity.

11. The apparatus of claim 10, wherein the one or more processors are further configured to transmit, to the network entity, a communication indicating the first L2 identifier and the second L2 identifier, wherein the indication associating the second UE with the first L2 identifier and the second L2 identifier is received from the network entity in response to the communication identifying the first L2 identifier and the second L2 identifier.

12. The apparatus of claim 11, wherein the communication indicating the first L2 identifier and the second L2 identifier is associated with a sidelink UE information for New Radio (NR) sidelink communication message.

13. The apparatus of claim 12, wherein the sidelink UE information for NR sidelink communication message includes a sidelink transmission resource requirement list, and wherein the first L2 identifier and the second L2 identifier are indicated by the sidelink transmission resource requirement list.

14. The apparatus of claim 11, wherein the communication indicating the first L2 identifier and the second L2 identifier further indicates a third L2 identifier of the first UE associated with the first sidelink and a fourth L2 identifier of the first UE associated with the second sidelink.

15. The apparatus of claim 10, wherein the indication associating the second UE with the first L2 identifier and the second L2 identifier is received via at least one of a medium access control (MAC) control element (MAC-CE) communication or a radio resource control (RRC) communication.

16. The apparatus of claim 2, wherein the one or more processors are further configured to transmit an indication that the physical node identifier of the first UE is not to be shared with other UEs.

17. The apparatus of claim 10, wherein the one or more processors are further configured to transmit, to the network entity, a request for a physical node identifier associated with the second UE, wherein the indication associating the second UE with the first L2 identifier and the second L2 identifier is received from the network entity in response to the request for the physical node identifier associated with the second UE.

18. An apparatus for wireless communication at a network entity, comprising:
one or more memories; and
one or more processors coupled to the one or more memories, the one or more memories comprising instructions executable by the one or more processors to cause the apparatus to:
receive, from a first user equipment (UE), a communication indicating a first layer 2 (L2) identifier associated with a first sidelink between the first UE and a second UE, and a second L2 identifier associated with a second sidelink between the first UE and the second UE;
receive, from the first UE, an indication that one or more L2 identifiers associated with the first UE are not permitted to be shared with the second UE; and
transmit, to the first UE, an indication associating the second UE with the first L2 identifier and the second L2 identifier.

19. The apparatus of claim 18, wherein the indication associating the second UE with the first L2 identifier and the second L2 identifier indicates a physical node identifier of the second UE.

20. The apparatus of claim 19, wherein the physical node identifier is a random number generated as a function of an international mobile subscriber identity (IMSI) associated with the second UE, or an international mobile equipment identity (IMEI) associated with the second UE.

21. The apparatus of claim 19, wherein the one or more processors are further configured to, based at least in part on the second UE changing at least one of the physical node identifier, the first L2 identifier, or the second L2 identifier, transmit, to the first UE, another indication associating the second UE with the first L2 identifier and the second L2 identifier.

22. The apparatus of claim 18, wherein the communication indicating the first L2 identifier and the second L2 identifier is associated with a sidelink UE information for New Radio (NR) sidelink communication message.

23. The apparatus of claim 22, wherein the sidelink UE information for NR sidelink communication message includes a sidelink transmission resource requirement list, and wherein the first L2 identifier and the second L2 identifier are indicated by the sidelink transmission resource requirement list.

24. The apparatus of claim 18, wherein the communication indicating the first L2 identifier and the second L2 identifier further indicates a third L2 identifier of the first UE associated with the first sidelink and a fourth L2 identifier of the first UE associated with the second sidelink.

25. The apparatus of claim 24, wherein the one or more processors are further configured to transmit, to the second UE, an indication associating the first UE with the third L2 identifier and the fourth L2 identifier.

26. A method of wireless communication performed by a first user equipment (UE), comprising:
establishing, with a second UE, a first sidelink associated with a first layer 2 (L2) identifier of the second UE and a second sidelink associated with a second L2 identifier of the second UE, wherein the first L2 identifier is different than the second L2 identifier;
transmitting an indication that one or more L2 identifiers associated with the first UE are not permitted to be shared with the second UE; and
receiving an indication associating the second UE with the first L2 identifier and the second L2 identifier.

27. The method of claim 26, wherein the indication associating the second UE with the first L2 identifier and the second L2 identifier is received via a unicast sidelink communication from the second UE.

28. The method of claim 26, wherein the indication associating the second UE with the first L2 identifier and the second L2 identifier is received from a network entity.

29. A method of wireless communication performed by a network entity, comprising:
receiving, from a first user equipment (UE), a communication indicating a first layer 2 (L2) identifier associated with a first sidelink between the first UE and a second UE, and a second L2 identifier associated with a second sidelink between the first UE and the second UE;
receiving, from the first UE, an indication that one or more L2 identifiers associated with the first UE are not permitted to be shared with the second UE; and
transmitting, to the first UE, an indication associating the second UE with the first L2 identifier and the second L2 identifier.

30. The method of claim 29, wherein the indication associating the second UE with the first L2 identifier and the second L2 identifier indicates a physical node identifier of the second UE.

* * * * *